3,700,613
FILLED COMPOSITIONS CONTAINING
3,9-DIVINYL SPIROBI
David A. Berry, Columbus, and Gilbert M. Gynn,
Hilliard, Ohio, assignors to Dart Industries, Inc.,
Los Angeles, Calif.
No Drawing. Continuation-in-part of application Ser. No.
843,815, July 22, 1969. This application July 15, 1971,
Ser. No. 163,088
Int. Cl. C08f 45/18
U.S. Cl. 260—17.4 CL                         3 Claims

ABSTRACT OF THE DISCLOSURE

Compositions comprising 3,9-divinyl spirobi (meta dioxane) and a filler such as alpha cellulose, glass fibers, polyester fibers and mixtures thereof have excellent stain resistance and hardness. Such compositions find application in articles of manufacture including dinnerware.

CROSS-REFERENCE TO RELATED APPLICATIONS

This application is a continuation-in-part of application Ser. No. 843,815, filed July 22, 1969, and now abandoned.

BACKGROUND OF THE INVENTION

This invention relates to compositions of matter containing 3,9-divinyl spirobi (meta dioxane). More particularly, it relates to compositions of an intimate blend of a polymer containing at least a minor amount of 3,9-divinyl spirobi (meta dioxane) and a reinforcing filler such as cellulose, glass and polyester fibers. The resulting compositions are ideal for use in dinnerware and laminated table tops.

Compositions of this invention find use in injection and compression molded articles of thermosetting resins. The resulting articles have excellent hardness and resistance to staining and particularly staining caused by coffee, tea, fruit and vegetable juices of all types, soft drinks and the like. As a result of these properties, the heat- and pressure-consolidated resinous articles of the compositions of this invention have ideal applications in dinnerware, e.g., flatware including cups, saucers, plates, and the like and in laminated table, bar and counter tops.

Reinforcing fillers such as powdered alpha cellulose have been added to molding compositions consisting of, e.g., ethylene glycol bis (allyl carbonate) to yield translucent products which though strong have not been found suitable to withstand the severe conditions required for dinnerware applications; see U.S. Pat. 2,403,112. In addition, such prior art compositions do not possess the degree of stain resistance possessed by the present compositions.

Melamine-formaldehyde resins have experienced widespread use in molded articles such as dinnerware. However, one of the major disadvantages of such resins is their susceptibility to various kinds of stains from coffee and the like as discussed above.

SUMMARY OF THE INVENTION

The present invention provides a composition of matter comprising an intimate blend of about 35 to 90 weight percent of a polymer containing at least 5 weight percent of 3,9-divinyl spirobi (meta dioxane) and at least 10 weight percent of a filler of cellulose, glass fibers, polyester fibers or mixtures thereof.

PREFERRED EMBODIMENTS OF THIS INVENTION

The composition of this invention comprises an intimate blend of preferably from about 35 to 80 weight percent and more preferably from about 50 to 80 weight percent of a polymer containing at least 5 weight percent of 3,9-divinyl spirobi (meta dioxane) and at least 20 weight percent of a filler preferably alpha cellulose to make up the balance of the composition. The types of polymers contemplated by the composition of this invention include homopolymers of 3,9-divinyl spirobi (meta dioxane) and physical admixtures comprising at least 5 weight percent of a homopolymer of 3,9-divinyl spirobi (meta dioxane) with another polymer that is compatible with the homopolymer including polymers consisting of the following compounds: vinyl aromatics, diallyl carbonate, diallyl phthalate, derivatives thereof and the like. Typical vinyl aromatics include styrene, alpha-methylstyrene, vinyltoluene and substituted styrenes or mixtures thereof. Also contemplated are the copolymers of at least 5 weight percent of 3,9-divinyl spirobi (meta dioxane) and a compatible comonomer including the foregoing compounds. Diallyl carbonate is the preferred comonomer.

The reinforcing filler that has been found to be especially effective in the compositions of this invention is alpha cellulose preferably in an amount of at least 20 weight percent based on the weight of the final composition. Other fillers which are suitable in the compositions of this invention include mill glass fibers between 1/10 and 1/4 inch in length and polyester flock sold under the registered trade mark "Dacron." The fillers may also include mixtures of the foregoing.

A preferred composition of this invention especially suitable for dinnerware application consists of an intimate blend of the following components:

(a) About 50 to 80 weight percent of a polymer consisting of a homopolymer of 3,9-divinyl spirobi (meta dioxane), a physical admixture of at least 10 percent of 3,9-divinyl spirobi (meta dioxane) based on the weight of the mixture and diallyl carbonate making up the balance or a copolymer of at least 10 percent of 3,9-divinyl spirobi (meta dioxane) based on the weight of the copolymer and diallyl carbonate making up the balance, and (b) About 20 to 50 weight percent of alpha cellulose.

A particularly preferred composition of this invention consists of an intimate blend of the following components:

(a) About 50 to 80 weight percent of a physical admixture of about 10 to 90 percent of a polymer of 3,9-divinyl spirobi (meta dioxane) based on the weight of the admixture and about 10 to 90 percent of a polymer of diallyl carbonate based on the weight of the admixture or a copolymer of about 10 to 90 percent of 3,9-divinyl spirobi (meta dioxane) based on the weight of the copolymer copolymerized with about 10 to 90 percent of diallyl carbonate based on the weight of the copolymer, and (b) About 20 to 50 weight percent of alpha cellulose. This particular composition has been found to have a Rockwell Hardness on the "M" Scale of at least about 100 and a stain resistance of less than 15 expressed as a color change in $R_d$ units on the Gardner Color Difference Meter. Specific examples of these compositions and results therefrom are set forth in the examples below.

3,9-divinyl spirobi (meta dioxane) can be represented by the formula:

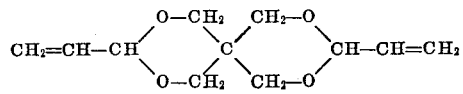

It can be obtained commercially and has a melting point of 42° C. and a specific gravity of 1.251.

The 3,9-divinyl spirobi (meta dioxane) is prepolymerized in the presence of a suitable solvent such as 1,4-dioxane with a suitable initiator, i.e., a peroxide initiator such as di-tertiary butyl perbenzoate, di-tertiary butyl peroxide, di-benzoyl peroxide, dilauroyl peroxide, cyclohexanone peroxide, tertiary-butyl hydroperoxide, di-acetyl peroxide, di-benzoyl peroxide, cumene hydroperoxide, dicumyl peroxide and the like, at a temperature of about 25° to 160° C. for a sufficient period of time to polymerize 10 to 50 weight percent, preferably 20 to 35 weight percent of the monomer to prepolymer. The resulting prepolymer product solution is then cooled and precipitated with a non-solvent and the resulting product is separated from the liquid phase and dried. The 3,9-divinyl spirobi (meta dioxane) can be copolymerized with one or more of the compatible comonomers listed above under the same conditions.

The compositions of this invention are prepared by dissolving in a suitable solvent, the prepolymer of 3,9-divinyl spirobi (meta dioxane) or the copolymer of the spirobi and a compatible comonomer or the physical admixture of the spirobi and a compatible polymer. To the solution is added the desired filler, one or more of the peroxide initiators, and a metallic stearate as a processing aid such as zinc, magnesium, calcium and sodium stearate. In addition to these components, other components which can be added to the solution to incorporate them into the compositions of this invention include pigments, delustrants, plasticizers, flame retardant materials and other materials known in the art to modify the chemical and physical properties of the finished filled 3,9-divinyl spirobi (meta dioxane)-containing polymer.

The mixture resulting from the combination of the above components is allowed to dry to remove the solvent. The resulting solid composition can then be ground or otherwise reduced into discrete particles and sold as a molding compound or molded into desired articles.

The composition of this invention may be mixed in any suitable blending apparatus, such as a cone-type mixer, double-arm mixer or the like to provide intimate contact between the blending components.

The examples below illustrate the preparation of the composition of the present invention and the results obtained therefrom.

EXAMPLE 1

This example illustrates the prepolymerization of the 3,9-divinyl spirobi (meta dioxane) for use in the compositions of the examples below.

Sixteen grams of benzoyl peroxide were dissolved in 400 grams of 1,4-dioxane in a reaction flask fitted with a condenser, $N_2$ gas inlet and thermometer. Four hundred grams of 3,9-divinyl spirobi (meta dioxane) were added to the resulting solution in the flask. The reaction mixture was heated from 35° to 90° C. in one hour and maintained at 90° ±2° C. for about 23 hours under a $N_2$ blanket to prepolymerize about 11% by weight of the monomer. The product mixture was cooled in a water bath to about 25° C. and mixed with n-hexane at a temperature of about 25° C. with vigorous agitation. After allowing the mixture to stand for a few minutes, a yellow layer developed on the bottom of the reaction flask, the upper layer was discarded and the yellow layer was washed with n-hexane at room temperature with vigorous agitation. The product was washed two more times to eliminate unreacted materials and solvent. The yellow syrup was redissolved in acetone and washed with n-hexane at room temperature. The product was filtered and dried overnight in a vacuum oven resulting in 45.1 grams of a fine, off-white powder having a melting point between 90° and 100° C.

EXAMPLE 2

45 grams of the prepolymerized product of Example 1 were dissolved in 45 grams of acetone in a mixing vessel. The following components were then added to the solution:

(a) 1.35 grams of $TiO_2$ pigment,
(b) 0.9 gram of zinc stearate to serve as a processing aid,
(c) 1.35 grams of t-butyl perbenzoate, and
(d) 15 grams of alpha cellulose flock sold under the trade name of Solka Flock SW 40.

The components were then blended in an Atlantic Research cone-type mixer. The resulting mixture was dried in a warm vacuum chamber for about ½ hour to remove the acetone. The composition contained about 70.6% by weight of 3,9-divinyl spirobi (meta dioxane) homopolymer and 23.6% by weight of alpha cellulose. This composition was then broken into small pieces and compression molded under a pressure of 3200 p.s.i.g. Compression molded samples were prepared by placing the material into the molds and heating the material at 320° F. for 2, 4 and 6 minutes, respectively. The average Rockwell Hardness values of these samples on the "M" Scale ranged from 89 to 99. In addition, cups were molded from the sample having a 6 minute molding time and measured for coffee stain resistance. The coffee stain resistance test comprised placing samples of the moldings in a bath of coffee containing two teaspoons of fresh instant coffee per cup of water at 180° F. for a period of 48 hours. The degree of staining was measured by determining the color of the samples before and after exposure to the coffee bath with a Gardner Color Difference Meter. The cups from the composition of this example were found to have a final color change of 4.3, expressed in $R_d$ units which measures whiteness, from the specimen's initial color. This value is in sharp contrast to the final color change of 43 as determined for a standard melamine-formaldehyde resin.

EXAMPLE 3

This example illustrates the results of a composition containing an admixture of 3,9-divinyl spirobi (meta dioxane) prepolymer with a diallyl carbonate prepolymer.

3 grams of a 3,9-divinyl spirobi (meta dioxane) prepolymer of Example 1 and 27 grams of a diallyl carbonate prepolymer were dissolved in 50 grams of acetone in a reaction vessel. The diallyl carbonate was formed by a reaction of 2.1 moles of allyl chloroformate and 2 moles of allyl alcohol in the presence of pyridine at 3° to 10° C. for a period of about 5 hours in an agitated reaction vessel. The resulting diallyl carbonate was recovered from the vessel and washed, dried and distilled. The diallyl carbonate was prepolymerized using essentially the same method described in Example 1 for preparing the prepolymer of the spirobi. The following components were then added to the admixture of the prepolymer of the spirobi and the diallyl carbonate dissolved in the acetone:

(a) 0.9 gram of $TiO_2$ pigment,
(b) 0.6 gram of zinc stearate,
(c) 0.9 gram of t-butyl perbenzoate, and
(d) 10.0 grams of alpha cellulose flock sold under the trade name "Solka Flock SW 40,"

and blended in the cone-type mixer. Compression molded samples were prepared in the same manner as described in Example 2 above. The average Rockwell Hardness values on the "M" Scale for samples heated at 2, 4 and 6 minutes, respectively, were in the range of 100 to 106. The color difference in $R_d$ units for this specimen after 6 minutes of molding time was 9.7.

EXAMPLE 4

This example illustrates the results of a composition of this invention containing a copolymer of 3,9-divinyl spirobi (meta dioxane) with diallyl carbonate.

16 grams of benzoyl peroxide were dissolved in 400 grams of 1,4 dioxane in a reaction flask equipped as in Example 1. 440 grams of 3,9-divinyl spirobi (meta dioxane) monomer and 360 grams of diallyl carbonate monomer were added to the resulting solution. The reaction mixture was heated from 20° C. to 70° C. in 3½ hours and maintained at 75 to 88° C. for 2½ hours under a nitrogen blanket to prepolymerize the two monomers. A product mixture was allowed to stand overnight and then precipitated by being added very slowly to n-hexane with rapid agitation. The material was collected and further washed with n-hexane, filtered and dried in a vacuum oven. The resulting product was redissolved in acetone and reprecipitated in n-hexane.

50 grams of the copolymer containing 10% by weight of 3,9-divinyl spirobi (meta dioxane) and 90% by weight of diallyl carbonate was dissolved in 50 grams of acetone. The following components were then added to the solution:

(a) 1.5 grams of $TiO_2$,
(b) 1.0 gram of zinc stearate,
(c) 1.5 grams of t-butyl perbenzoate, and
(d) 16.7 grams of the alpha cellulose flock, and then blended in the cone-type mixer.

The resulting mixture was recovered and molded as described in Example 2. The average Rockwell Hardness values on the "M" Scale for samples heated for 2, 4 and 6 minutes, respectively, ranged from 100 to 104. The coffee stain resistance of the sample after a mold time of 6 minutes resulted in a final color difference on the $R_d$ Scale of 11.2.

The foregoing examples have shown the unexpected improvement in the stain resistance of the composition of the present invention when compared with standard commercial grades of melamine-formaldehyde resins. In addition, the hardness for the present compositions are on the same high level as melamine-type resins which make them ideally suited for dinnerware applications.

What is claimed is:

1. A composition of matter consisting of an intimate blend of the following components:
    (a) about 50 to 80 weight percent of a physical admixture of about 10 to 90 percent of a polymer of 3,9-divinyl spirobi (meta dioxane) based on the weight of said admixture and about 10 to 90 percent of a polymer of diallyl carbonate based on the weight of said admixture or a copolymer of about 10 to 90 percent of 3,9-divinyl spirobi (meta dioxane) based on the weight of said copolymer copolymerized with about 10 to 90 percent of diallyl carbonate based on the weight of said copolymer, and
    (b) about 20 to 50 weight percent of alpha cellulose.

2. As an article of manufacture, dinnerware consisting of an intimate blend of the following components:
    (a) about 50 to 80 weight percent of a physical admixture of about 10 to 90 percent of a polymer of 3,9-divinyl spirobi (meta dioxane) based on the weight of said admixture and about 10 to 90 percent of a polymer of diallyl carbonate based on the weight of said admixture or a copolymer of about 10 to 90 percent of 3,9-divinyl spirobi (meta dioxane) based on the weight of said copolymer copolymerized with about 10 to 90 percent of diallyl carbonate based on the weight of said copolymer, and
    (b) about 20 to 50 weight percent of alpha cellulose, said article of manufacture having a Rockwell Hardness on the "M" Scale of at least about 100 and a stain resistance of less than 15 expressed as a color change in $R_d$ units on the Gardner Color Difference Meter.

3. A process for preparing a molding composition which comprises:
    (a) dissolving in a suitable solvent a physical admixture of polymers consisting of about 10 to 90 percent of a prepolymer of 3,9-divinyl spirobi (meta dioxane) based on the weight of said admixture and about 10 to 90 percent of a prepolymer of diallyl carbonate based on the weight of said admixture or a copolymer formed from the copolymerization of the monomers of 3,9-divinyl spirobi (meta dioxane) and diallyl carbonate, said copolymer consisting of about 10 to 90 percent of 3,9-divinyl spirobi (meta dioxane) and the diallyl carbonate making up the balance,
    (b) adding to and blending with the resulting solution alpha cellulose, at least one peroxide initiator, and a processing aid which is zinc, magnesium, calcium or sodium stearate,
    (c) drying the resulting mixture to remove said solvent, and
    (d) recovering a molding composition.

References Cited
UNITED STATES PATENTS

| | | | |
|---|---|---|---|
| 2,403,112 | 7/1946 | Muskat | 260—67 |
| 2,972,601 | 2/1961 | Guest et al. | 260—67 |
| 3,247,282 | 4/1966 | Englisch et al. | 260—827 |
| 3,644,242 | 2/1972 | Berry et al. | 260—17.4 CL |

WILLIAM H. SHORT, Primary Examiner

E. WOODBERRY, Assistant Examiner